Sept. 18, 1928.
E. C. BALLMAN
MOTOR STARTING DEVICE
Filed Nov. 22, 1921
1,684,937
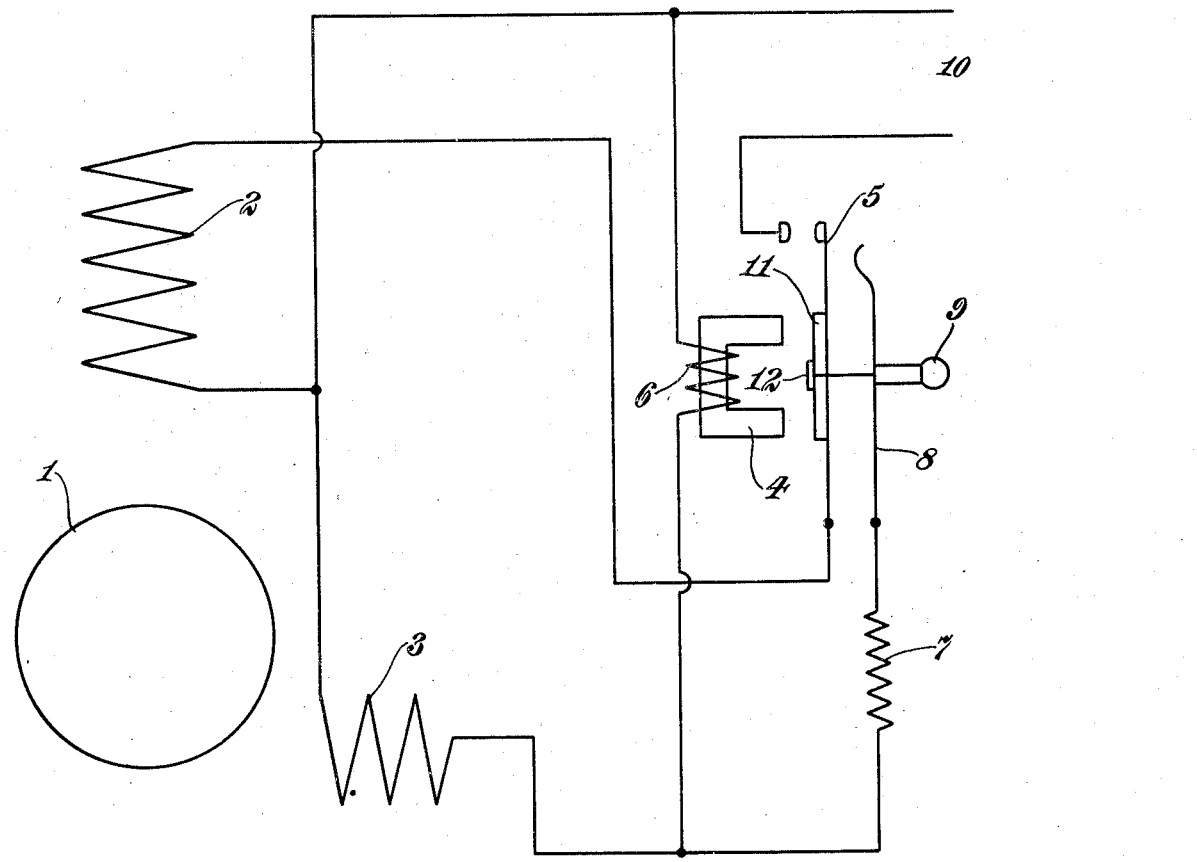
Inventor:
EDWIN C. BALLMAN,
By John W. Bruninga,
His Attorney.

Patented Sept. 18, 1928.

1,684,937

UNITED STATES PATENT OFFICE.

EDWIN C. BALLMAN, OF ST. LOUIS, MISSOURI, ASSIGNOR TO VALLEY ELECTRIC COMPANY, OF WILMINGTON, DELAWARE, A CORPORATION OF DELAWARE.

MOTOR-STARTING DEVICE.

Application filed November 22, 1921. Serial No. 517,024.

This invention relates to motor starting and protective devices and is intended for use more particularly with so-called split phase motors.

As is well known, the split phase motor is usually provided with a main winding and an auxiliary starting winding.

These windings are connected in parallel during the starting operation, a series resistance being connected into the starting winding circuit in order to throw the current in that circuit out of phase with the current in the main winding so as to provide the necessary revolving field for starting. When the motor is up to speed, the starting winding is opened and usually remains open during normal operation. The electro-motive-force induced in the open starting winding during normal operation is substantially proportional speed.

It is one of the objects of this invention, therefore, to utilize the changes of electromotive force in this starting winding to operate a protective device to open the motor circuit under abnormal conditions.

Another object of this invention is to combine such a protective device with the starting device so that the same may be embodied in a compact and unitary structure.

Another object of this invention is to provide a starting device which shall be simple to operate and which will operate the motor against carelessness in handling and also against abnormal operating conditions.

Further objects will appear from the detail description taken in connection with the accompanying drawing which illustrates diagrammatically the circuits and apparatus embodying this invention.

Referring to the accompanying drawing, 1 designates the motor armature, 2 the main field winding and 3 the starting winding. These are connected to the supply line 10 through the starting device.

The starting device comprises a switch 5 adapted to connect the winding 2 to the supply line. This switch may be arranged to stand normally open by means of a spring operated blade or other suitable device. The blade may be provided with a keeper 11 adapted for cooperation with a holding magnet 4 so that when the switch is closed and the magnet energized, said magnet will hold the switch closed.

The magnet 4 is provided with a winding 6 which is connected across the terminals of the motor starting winding 3 so as to be energized by the electro-motive force induced in said starting winding.

The starting winding 3 is connected to the supply circuit through the usual resistance 7 and an auxiliary blade 8 cooperating with the starting switch 5. This blade 8 is also spring-opened and is adapted when manipulated by means of the push-button handle 9 to make contact with the blade of the switch 5 before said switch closes to connect the main winding to the supply line. Upon release of the handle 9, the blade 8 will spring back so as to open the starting winding 3 even though the switch 5 may be held closed by the magnet 4. The handle 9 may be provided with an extension 12 adapted to engage the switch 5 so that said switch may be opened manually by pulling on the handle 9. It is, of course, to be understood that the handle 9 represents a manipulative element which may be of any well known form including electrically operated manipulative devices which may be controlled from a distance.

The operation of the device is as follows: In starting a motor the manipulative element 9 is operated to first bring the switch blade 8 into contact with the blade of the switch 5 so as to connect the main winding 2 and the starting winding 3 together and then the switch 5 is closed to connect both windings to the supply line 10. The motor now starts in the well known manner. When the motor has reached full speed, the element 9 is released and the starting winding is opened by the spring action of the blade 8. The switch 5, however, will be held closed by the magnet 4 whose winding 6 is energized by the electro-motive force induced in the winding 3. The apparatus will be maintained in this condition so long as normal running conditions are maintained in the motor. When abnormal conditions obtain as, for instance, when the motor is heavily overloaded, the speed thereof will drop and consequently the electro-motive force induced in the winding 3 will be reduced, thereby reducing the excitation of the magnet 4 to a point where it will release the switch 5 to open the circuit and stop the motor. If under otherwise normal operating conditions, the voltage of the supply line 10 should be reduced the electromotive force across the winding 3 will be correspondingly reduced and the magnet 4 will release the switch 5 to open the circuit.

It will be seen that this device provides both a starting device and a protective device for the motor as it is responsive to changes in the electrical conditions within the motor to protect the same against such conditions becoming abnormal and it is also responsive to changes in the supply line and will equally protect the motor against consequences thereof.

It is obvious that various changes may be made in details of construction without departing from the spirit of this invention; it is, therefore, to be understood that this invention is not to be limited to the specific details shown and described.

Having thus described the invention, what is claimed is:

1. In combination with an induction motor having main and starting windings, a switch adapted to connect said windings to a source of supply, and an electro-magnet connected in circuit with and controlled by current traversing the starting winding adapted to hold said switch to maintain connection with the source of supply.

2. In combination with an induction motor having main and starting windings, a switch adapted to connect said windings to a source of supply, and an electro-magnet connected across said starting winding and adapted to hold said switch to maintain connection with the source of supply.

3. In combination with an electric motor having a main winding and an auxiliary winding, a starting device, comprising, a double-bladed switch having one blade connected to the auxiliary winding and adapted for manipulation to contacting engagement with the other blade, and to move said other blade into contacting engagement with the supply circuit, means for holding said second blade in engagement with the supply circuit, and means for disengaging said first blade.

4. In combination with an electric motor having a main winding and a starting winding, a starting device, comprising, manipulative means for connecting said windings together and to the line, means adapted upon release of said manipulative means to render said starting winding inactive, and magnetic means for holding said main winding closed.

5. In combination with an electric motor having a main winding and an auxiliary winding, a starting device, comprising, manipulative means for connecting said windings together and to the line, means adapted upon release of said manipulative means to open said auxiliary winding, and means connected to said auxiliary winding adapted to hold said main winding closed.

6. In combination with an electric motor having a main winding and an auxiliary winding, a starting device, comprising, manipulative means for connecting said windings together and to the line, means adapted upon release of said manipulative means to open said auxiliary winding, and means connected to and responsive to changes of electro-motive force in said auxiliary winding adapted to hold said main winding closed.

7. In combination with an electric motor having a main winding and an auxiliary winding, a starting device, comprising, manipulative means for connecting said windings together and to the line, means adapted upon release of said manipulative means to open said auxiliary winding, and means connected to said auxiliary winding adapted to hold said main winding closed and upon change in said auxiliary winding to open said main winding.

8. In combination with an electric motor having a main winding and an auxiliary winding, a starting device, comprising manipulative means for connecting said windings together and to the line, means adapted upon release of said manipulative means to open said auxiliary winding, and means for holding said main winding closed adapted to open said main winding upon change of the motor speed.

9. In combination with an electric motor having a main winding and an auxiliary winding, a starting device, comprising, a double-bladed switch having one blade connected to the auxiliary winding, said blades being adapted for manipulation to contacting engagement with the supply circuit, means for holding said second blade in engagement, and means for disengaging said first blade.

10. In combination with an electric motor having a main winding and an auxiliary winding, a starting device, comprising, a double-bladed switch having one blade connected to the auxiliary winding and adapted for manipulation to contacting engagement with the other blade, said second blade being connected to the main winding and adapted for contacting engagement with the supply circuit, means connected to one of said windings for holding said second blade in engagement, and means for disengaging said first blade.

11. In combination with an electric motor having a main winding and an auxiliary winding, a starting device, comprising, a double-bladed switch having one blade connected to the auxiliary winding and adapted for manipulation to contacting engagement with the other blade, said second blade being connected to the main winding and adapted for contacting engagement with the supply circuit, means connected to said auxiliary winding for holding said second blade in engagement, and means for disengaging said first blade.

12. In combination with an electric motor having a main winding and an auxiliary winding, a starting device, comprising, a switch adapted to connect said windings together and thereafter to connect said windings to the supply line, and adapted to automatically open said auxiliary winding.

13. In combination with an electric motor having a main winding and an auxiliary winding, a starting device, comprising, a switch adapted to connect said windings together and thereafter to connect said windings to the supply line, and adapted to automatically open said auxiliary winding while said main winding is held closed.

In testimony whereof I affix my signature this 28th day of April, 1921.

EDWIN C. BALLMAN.